(12) United States Patent
Shima

(10) Patent No.: US 6,528,728 B1
(45) Date of Patent: Mar. 4, 2003

(54) STRUCTURE FOR ACCOMMODATING ELONGATED ELECTRIC WIRES IN A PROTECTOR, AND METHOD AND SYSTEM FOR PROVIDING A PARALLEL ARRAY OF ELONGATED WIRES

(75) Inventor: Noriyasu Shima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/642,757

(22) Filed: Aug. 22, 2000

(30) Foreign Application Priority Data

Aug. 23, 1999 (JP) .......................................... 11-235205

(51) Int. Cl.$^7$ ............................................... H02G 3/00
(52) U.S. Cl. ..................... 174/101; 174/138 E; 174/97; 174/72 A; 269/287
(58) Field of Search ............................ 174/101, 138 E, 174/97, 68.3, 72 A, 69, 95, 96, 99 R; 361/826; 52/220.7; 269/287, 43, 296

(56) References Cited

U.S. PATENT DOCUMENTS

| | | | | |
|---|---|---|---|---|
| 3,809,798 A | * | 5/1974 | Simon ......................... | 174/135 |
| 4,156,795 A | * | 5/1979 | Lacan ......................... | 174/101 |
| 4,744,010 A | * | 5/1988 | Witte .......................... | 174/101 |
| 4,864,082 A | * | 9/1989 | Ono et al. ................... | 138/115 |
| 4,942,271 A | * | 7/1990 | Corsi et al. ................. | 138/162 |
| 5,332,866 A | | 7/1994 | Sawamura | |
| 5,338,014 A | | 8/1994 | Kitamura | |
| 5,401,905 A | * | 3/1995 | Lesser et al. ............... | 138/108 |
| 5,581,873 A | * | 12/1996 | Okura et al. ................ | 269/903 |
| 5,614,695 A | * | 3/1997 | Benito Navazo ........... | 174/48 |
| 5,665,936 A | * | 9/1997 | Sawamura et al. .......... | 174/27 |
| 5,848,783 A | * | 12/1998 | Weissenborn ............... | 269/236 |
| 5,902,961 A | * | 5/1999 | Viklund et al. ............. | 174/100 |
| 6,084,180 A | * | 7/2000 | DeBartolo et al. .......... | 174/101 |
| 6,145,253 A | * | 11/2000 | Gallant et al. .............. | 52/220.1 |
| 6,323,421 B1 | * | 11/2001 | Pawson et al. .............. | 174/48 |
| 6,330,746 B1 | * | 12/2001 | Uchiyama et al. .......... | 174/72 A |

FOREIGN PATENT DOCUMENTS

| | | | |
|---|---|---|---|
| JP | 11201331 | | 7/1999 |
| JP | 11201331-a | * | 7/1999 |

OTHER PUBLICATIONS

English Language abstract of JP–11–201331.

* cited by examiner

Primary Examiner—Dean A. Reichard
Assistant Examiner—Jinhee Lee
(74) Attorney, Agent, or Firm—Greenblum & Bernstein, P.L.C.

(57) ABSTRACT

A structure and method are provided for accommodating elongated electric wires in a protector in a parallel array. The structure includes a plurality of elongated electric wires to be arranged in parallel, a trough-like receiving member for accommodating the elongated electric wires in a parallel condition, and a cover member for covering the open upper face of the receiving member. The elongated electric wires are held by a clamp member for arraying the elongated electric wires in the required parallel condition. The clamp members are positioned at required distances along the length of the elongated electric wires, and engaging parts for positioning the clamp members are provided in the receiving member, so that the elongated electric wires are accommodated in parallel condition. The method includes providing a protector having a trough-shaped receiving member, providing at least one clamp member configured to clampingly receive a plurality of electric wires in parallel, first clamping the plurality of electric wires in the at least one clamp member, and then inserting the at least one clamp member at a predetermined location in the receiving member to form the parallel array.

18 Claims, 5 Drawing Sheets

Fig. 4
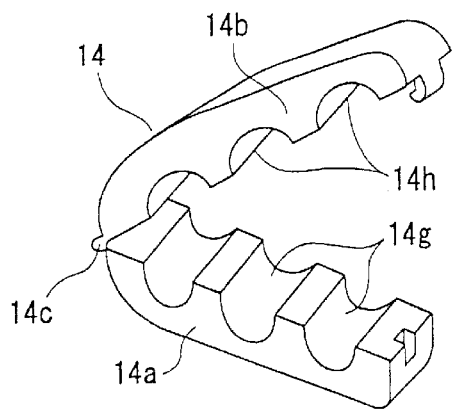
Fig. 5(A)  Fig. 5(B)
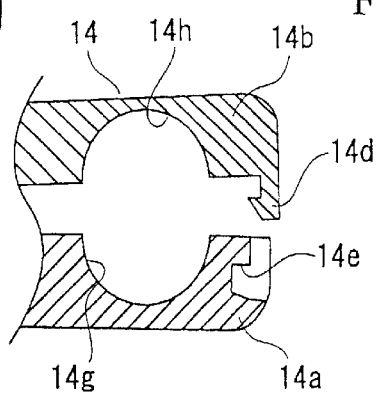 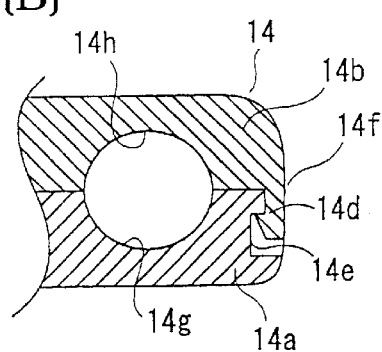
Fig. 6
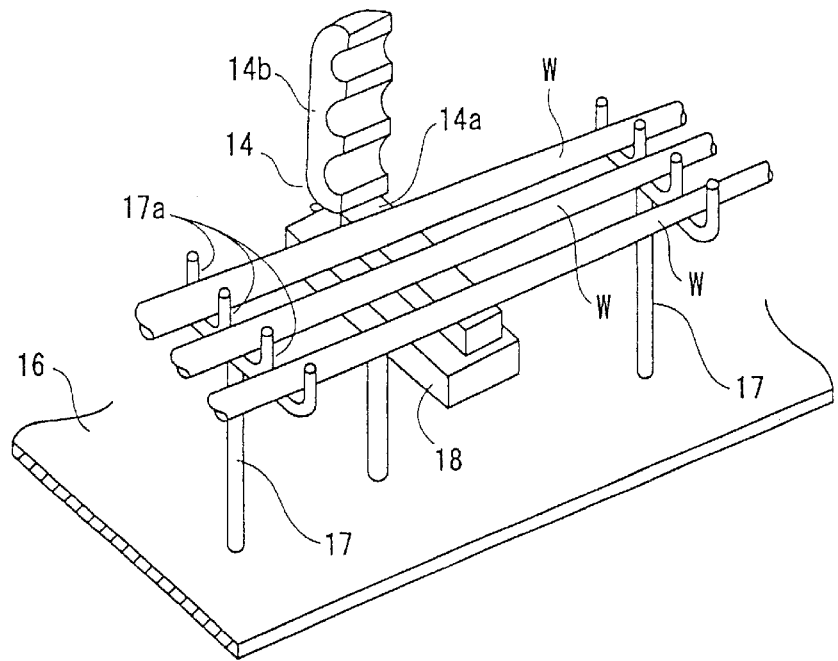

Fig. 10(A) [PRIOR ART]

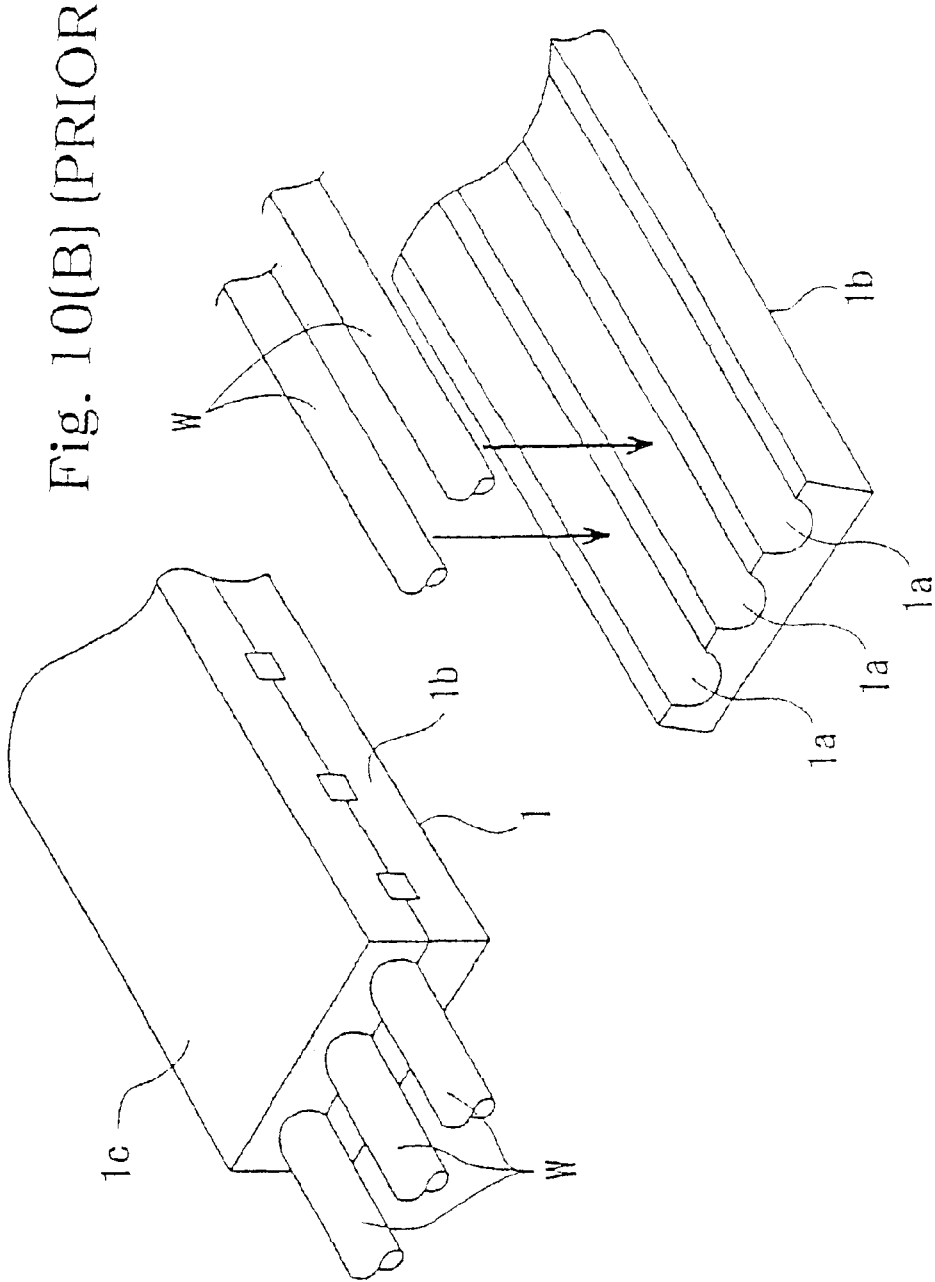

STRUCTURE FOR ACCOMMODATING ELONGATED ELECTRIC WIRES IN A PROTECTOR, AND METHOD AND SYSTEM FOR PROVIDING A PARALLEL ARRAY OF ELONGATED WIRES

BACKGROUND OF THE INVENTION

1. Field of the Invention

The present invention relates to an accommodating structure for elongated electric wires in a protector. More particularly, the present invention is configured to improve the working effect in accommodating elongated electric wires in an array in a protector.

2. Description of Background Information

As means for protecting the electric wires which constitute a wire harness for automobile, resin-made protectors are frequently used for various portions. As shown in FIG. 10(A), in an wire harness for electric vehicles which supplies large current from a source power, such as in the wire harness W/H for connecting the front part with the rear part of automobile, an electric wire is used having a length of more than 1 m and, for large current, having a diameter of more than 10 mm.

In order to dispose a plurality of such elongated wires W in parallel condition and protect the wires, as shown in FIGS. 10(B) and 10(C), an elongated protector 1 is used. The protector includes a receiving member 1b having an elongated wire groove 1a into which an elongated wire W is to be accommodated, and a cover member 1c.

However, accommodating a plurality of elongated wires W of large diameter in parallel rows without displacement is extremely difficult. This is to say, the elongated electric wires W accommodated in the grooves 1a must be held in a manner without upward movement until they are completely covered by the cover member 1c. Especially in the case of large diameter elongated wires W for large current, which have a tendency to exhibit curvature even after placement into the groove 1a, partial upward movement is likely, making the accommodating work more difficult.

SUMMARY OF THE INVENTION

The present invention has been made in view of the above problems. The present invention provides a structure for accommodating elongated electric wires in a protector, including a plurality of elongated electric wires, at least one trough-like receiving member for accommodating the elongated electric wires in parallel and a cover member for covering an open upper face of the receiving member. Furthermore, elongated electric wires are held by a clamp member to array the elongated electric wires in the required parallel condition, and the clamp members are positioned at predetermined distances in the longitudinal direction of the elongated electric wires. Engaging parts are formed in the receiving member at predetermined distances for fixedly engaging a respective clamp member, so that the elongated electric wires are accommodated in parallel condition in the receiving members via the clamp members.

According to the above construction, a plurality of elongated electric wires can be pre-positioned in partially parallel condition by the clamp members. For this purpose, the elongated electric wires can be sequentially arranged in parallel in a receiving member simply by pushing the clamp members into the engaging portion of the respective receiving member in an engaging manner. Moreover, since the elongated electric wires pushed into the receiving member are fixed in position at each predetermined distance by engagement between the clamp member and the engaging portion, upward movement of the elongated electric wires can be prevented during the closing of the cover on the receiving member, thereby improving the workability of the parallel arrangement operation of the elongated electric wires in the protector.

The clamp member may be formed by dividing the clamp member into upper and lower parts at a central plane to form complementary surfaces having at least one groove for accommodating the elongated electric wires. Accordingly, at the time the elongated electric wires are laid out on a working table during assembly of the wire harness, the clamp member can be readily fitted to the elongated electric wires at predetermined distances by clamping the elongated electric wires with the clamp member.

As the engaging portions of the receiving members, it is preferable to form a pair of projecting strips or indented grooves for receiving the clamp members in clamp form. The engaging portions are preferably formed at predetermined positions on the bottom surface of the receiving members, and/or on the inner surface of opposite side walls of the receiving members. The clamp members may be formed for connection in a vertical stack of two or more clamp members, and/or in horizontal rows of two or more, so as to accommodate the elongated electric wires in the protector in parallel condition of two or more tiers.

In an aspect of the present invention, a protector for accommodating elongated electric wires is provided. The protector includes at least one trough-shaped receiving member for accommodating the electric wires in a parallel array, a cover member for covering an open upper face of the receiving member, and at least one clamp member, provided separately from the receiving member, that clamps and holds the electric wires in the parallel array. The receiving member may include at least one engaging part for positioning the at least one clamp member at a predetermined position.

In other aspects of the present invention, the protector may further include a plurality of the clamp members, and a plurality of the engaging parts may be provided at spaced distances to receive a respective one of the clamp members to position the electric wires in the parallel array along the protector. Additionally, the at least one engaging part may be provided on at least one of a bottom wall of the receiving member and opposed side walls of the receiving member. Moreover, the at least one engaging part may be configured as one of spaced parallel projections and a recess having spaced parallel walls, with the engaging part configured to receive and hold the clamp member in position.

In further aspects of the present invention, the at least one clamp member may include an upper part and a lower part, each the upper part and lower part having a complementary mating surface including at least one groove that receives one of the electric wires when the upper and lower parts are positioned in mating engagement. Additionally, the upper and lower parts may include complementary locking elements to retain the upper and lower parts in mating engagement, and may also further include a hinge element connecting first ends of the upper and lower parts, with the complementary locking elements provided on second ends of the upper and lower parts.

According to another aspect of the present invention, a method of providing a parallel array of elongated electric wires in a protector is provided. The method includes providing a protector including a trough-shaped receiving member, providing at least one clamp member configured to clampingly receive a plurality of electric wires in parallel, first clamping the plurality of electric wires in the at least one clamp member, and then inserting the at least one clamp member at a predetermined location in the receiving member to form the parallel array.

In another aspect of the present invention, the method may also include providing a plurality of the clamp members, clamping the plurality of wires at spaced locations along the length of the wires, and then inserting the clamp members at predetermined spaced locations in the receiving member.

In still other aspects of the present invention, the method may further include providing a plurality of engaging parts at each predetermined location to receive and hold the inserted clamp members. Additionally, each clamp member may include an upper part and a lower part, each upper part and lower part having a complementary mating surface including at least one groove that receives one of the electric wires when the upper and lower parts are positioned in mating engagement. Furthermore, the upper and lower parts may include complementary locking elements to retain the upper and lower parts in mating engagement, and may further include a hinge element connecting first ends of the upper and lower parts, with the complementary locking elements being provided on second ends of the upper and lower parts.

A further aspect of the invention encompasses a system for providing a parallel array of elongated wires that includes a work support surface, at least two wire holders mounted on the work support surface, each wire holder configured to retain a plurality of wires in a spaced parallel array and at a position spaced above the work support surface, and at least one clamp member configured to clampingly receive the plurality of wires in the parallel array. The system further includes at least one clamp holder mounted on the work support surface between the at least two wire holders, the at least one clamp holder having a portion spaced from the work support surface and configured to receive a lower surface of a respective one of the clamp members, so that the at least two wire holders maintain the plurality of wires in the spaced parallel array during installation of the clamp member on the plurality of wires, and the clamp holder maintains the clamp member in position during installation so that the clamp member can be readily positioned to retain the plurality of wires in the spaced parallel array.

In other aspects of the present invention, the system may also include each clamp member having an upper part and a lower part, with each upper part and lower part having a complementary mating surface including at least one groove that receives one of the plurality of wires when the upper and lower parts are positioned in mating engagement. Further, the upper and lower parts may include complementary locking elements to retain the upper and lower parts in mating engagement, and a hinge element may be provided for connecting first ends of the upper and lower parts, with the complementary locking elements provided on second ends of the upper and lower parts.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several view of the drawings, and wherein:

FIG. 4 is a perspective view of a clamp member according to the present invention;

FIG. 5(A) and FIG. 5(B) are each partial cross-sectional views of the clamp member of FIG. 4;

FIG. 6 is a perspective view showing the assembly of elongated electric wires in a clamp member according to the present invention;

FIGS. 10(A) through 10(C) are views depicting conventional embodiments.

DESCRIPTION OF THE PREFERRED EMBODIMENTS

Figure 1:
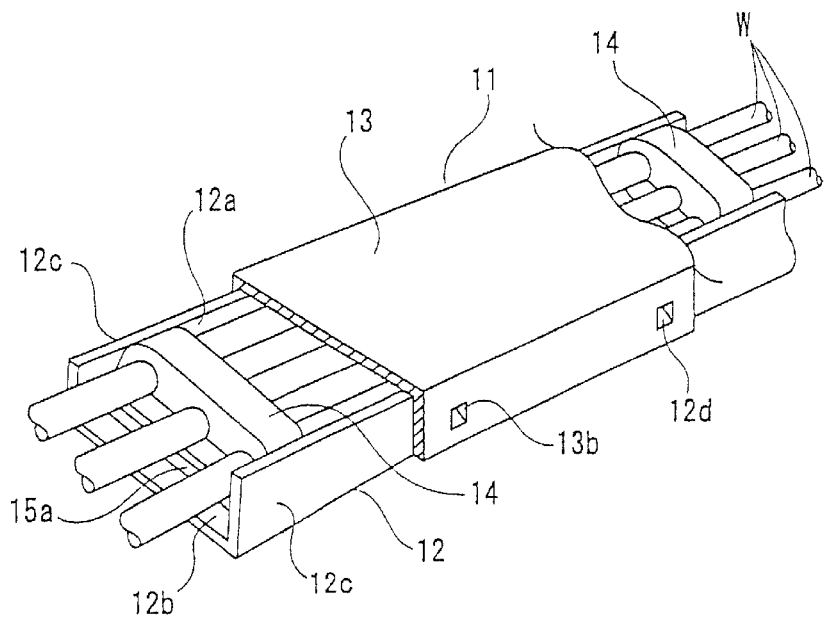
FIG. 1 is a perspective view, with portions broken away, of an accommodating structure for elongated wires in the protector according to the present invention.
Figure 2:
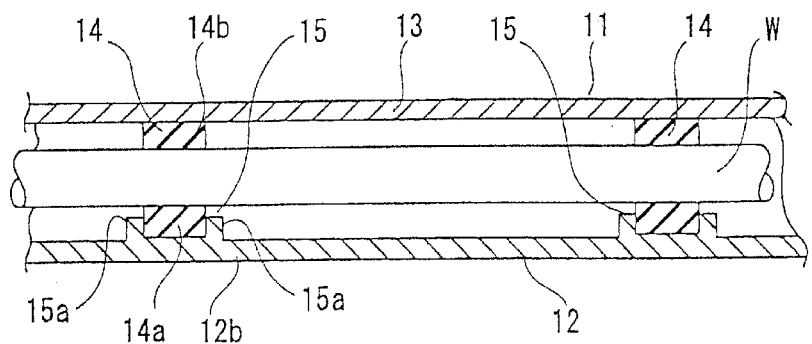
FIG. 2 is a vertical cross-sectional view of the embodiment of FIG. 1.
Figure 3:
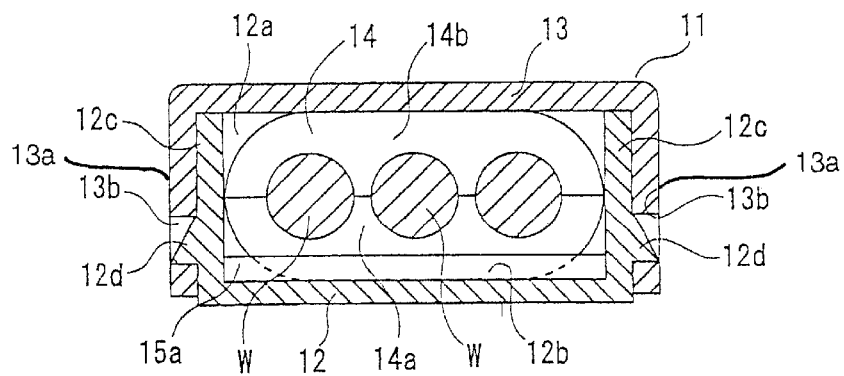
FIG. 3 is a vertical cross-sectional view of the embodiment of FIG. 1.

A preferred embodiment of the present invention will now be illustrated in detail with reference to the appended drawings as follows:

FIGS. 1 through 3 show the accommodating structure of the elongated electric wires in the protector according to the present invention, which includes a plurality of elongated electric wires W to be arranged in parallel in the protector 11. A trough-shaped receiving member 12 is provided for accommodating the elongated electric wires W in parallel condition, and a cover member 13 is provided to cover the upper open face 12a of the said receiving member 12. Additionally, a clamp member 14 is provided for positioning and holding the elongated electric wires W in a parallel condition.

With respect to the elongated electric wires W, wires carrying a large current to be used for an electric vehicle, and having a diameter of about 10 mm and a length of about 1 m, may be provided, for example. In the present embodiment, three wires are arranged in parallel in the receiving member. However, any suitable number of wires may be utilized with an appropriately configured clamp member.

The clamp member 14 is divided into a lower part 14a and an upper part 14b with respect to a central plane generally parallel to the elongated electric wires W. At one end of the clamp member, the upper and lower parts are connected in a manner to be opened or closed via a hinge 14c, as shown in FIG. 4. At the other end, as shown in FIGS. 5(A) and (B), a lock 14f including a lock hook 14d is formed on one part and an engaging groove 14e is formed on the other part. On the abutting faces between the lower part 14a and the upper part 14b, there are formed generally semicircular grooves 14g, 14h for holding the elongated electric wires W, respectively, by insertion in parallel condition. In FIG. 4, a construction of a clamp member 14 is shown that is formed by connecting one end with a hinge 14c. However, the clamp member may be formed with both ends having the lock parts 14f so as to divide the lower part 14a and the upper part 14b into two separate parts.

The above described receiving member 12 includes a bottom wall 12b and side walls 12c upstanding from opposite sides of the bottom wall 12b. The dimension between the inner faces of the side walls 12c is set to correspond to the width of the clamp members 14, and the height dimension of the inner surface of the side walls 12c is set to correspond to the height dimension of the clamp member 14. As shown in FIG. 2, the bottom wall 12b of the receiving member 12 is provided with engaging portions 15 for positioning and fixing the clamp members 14. The engaging portions 15 are formed by a pair of projecting strips 15a provided to project from the bottom wall 12b in a manner to clamp the clamp member 14 from both sides. The projecting strips 15a may be formed in any suitable manner, such as unitarily and in one piece with bottom wall 12b, or by forming as separate members and attaching to the bottom wall 12b, for example, with adhesive. Thus, the clamp member 14, in coordination with the thickness of the elongated electric wires W, hold the elongated wires in an axial direction transverse to the clamp member 14.

Figure 7:
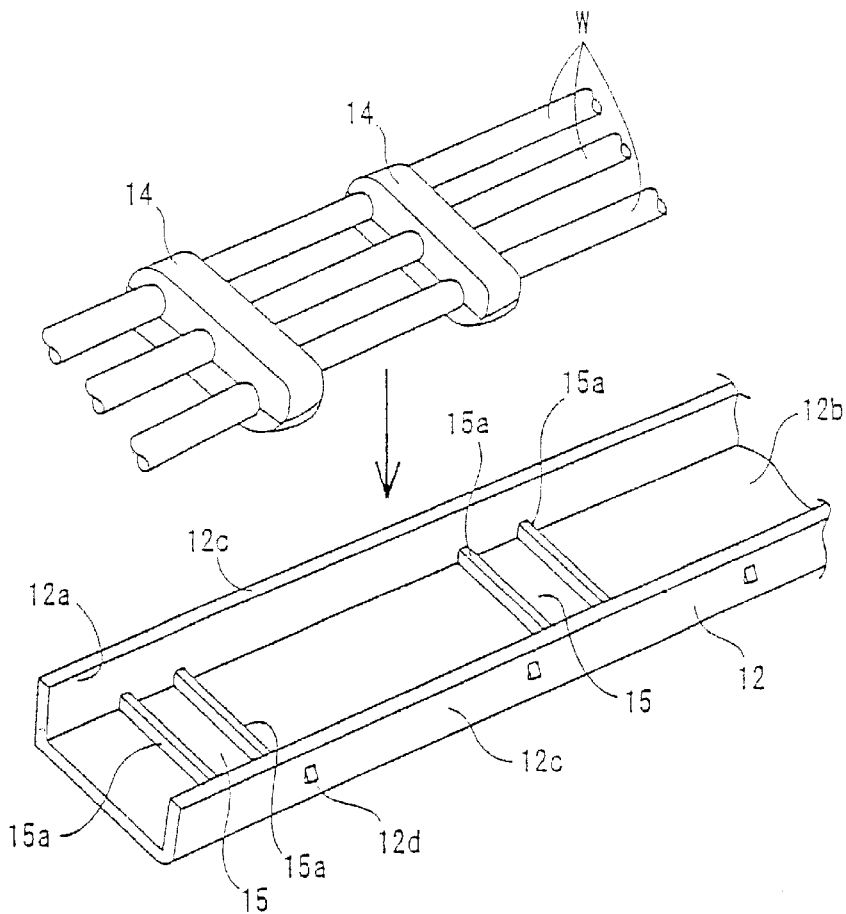
FIG. 7 is a perspective view showing the assembly of the elongated electric wires and clamp members into the protector according to the present invention.

The cover member 13 is formed to have a trough-shape in the same manner as in the receiving member 12, and is freely detachably engaged with the two outer side walls 12c in a manner to cover the open upper surface 12a of the receiving member 12. As shown in FIGS. 1, 3 and 7, both side surfaces 13a of the cover member 13 are provided with lock holes 13b to engage the lock hooks 12d provided to project from the outer surface of the side wall 12c of the receiving member 12, so that the cover member 13 is fixedly engaged with the receiving member 12 by the lock hooks 12d and the lock holes 13b.

Next, to explain the step of accommodating the large diameter elongated electric wires in a protector having the above construction, as shown in FIG. 6, a work surface 16 is provided with electric wire holders 17 having a receiving part 17a for receiving three elongated electric wires W in parallel arrangement. Further, in alignment with the elongated electric wire W, clamp holders 18 for positioning and holding the clamp members 14 are provided at predetermined spaced distances, for example, at about 50 cm intervals.

Under this condition, the elongated electric wires W are laid along the electric wire holders 17, and the elongated electric wires W are placed within the grooves 14g of the lower part 14a of the clamp member 14.

After completion of the wire laying work of the elongated electric wires, the upper part 14b of the clamp member 14 is moved toward the lower part 14a and simultaneously locked by the lock part 14f, thereby clamping the elongated electric wires W between the lower part 14a and the upper part 14b. In this manner, the three elongated electric wires W are fixed in the required parallel condition by the clamping action of the clamp members 14 positioned at each required distance.

Next, the elongated electric wires W are removed from the electric wire holders 17 along with the clamp members 14, and, as shown in FIG. 7, the elongated electric wires W are accommodated in the receiving members 12 by inserting the clamp member 14 into the space between the projecting strips of the engaging parts 15 projecting from the receiving member 12 at each required distance. During the accommodating work, the elongated electric wires W are fixed in parallel condition by the clamp member 14, and no additional effort is required to counter the effect of the bending tendency of the elongated electric wires W. Next, the cover member 13 is positioned to cover the open upper surface 12a of the receiving member 12, and the lock hooks 12d are engaged with the lock holes 13b to cause the receiving member 12 to be integrally connected with the member 13.

Figure 8A:
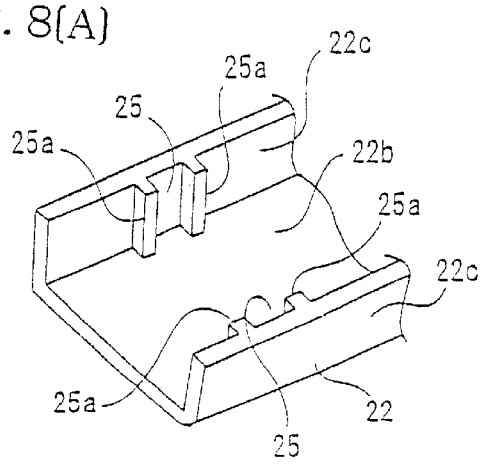
FIG. 8(A) is a perspective view and FIG. 8(B) is a cross-sectional view according to the present invention showing a modification of the engaging portion in the receiving members according to another embodiment of the present invention.
Figure 8B:
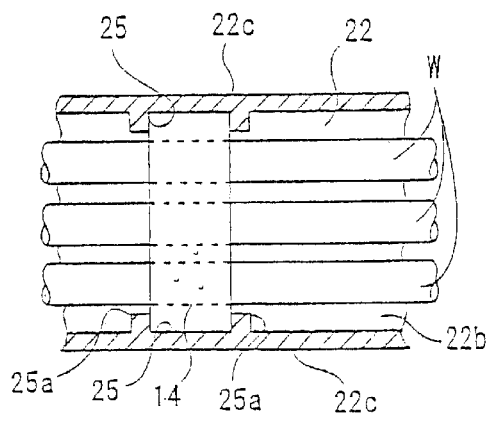

Another embodiment of the present invention is depicted in FIG. 8, which shows a modified embodiment of the receiving member. In this embodiment, the receiving member 22 is formed in such manner that projecting ribs 25a are formed as the engaging part 25 on both side walls 22c, rather than on the bottom face 22b.

In this case, it is possible to improve further the inserting operation of the clamp member 14 by the guidance of the projecting ribs 25a. Furthermore, the engaging parts 15, 25 may be formed on both the bottom walls 12b, 22b and the side walls 12c, 22c. Alternatively, grooves may be provided instead of the projecting ribs 15a, 25a.

Figure 9A:
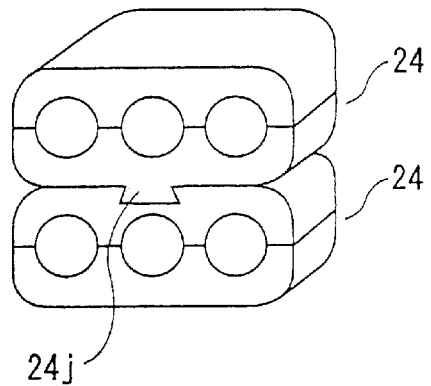
FIGS. 9(A) and FIG. 9(B) are perspective views showing modifications of the clamp members according to further embodiments of the present invention.
Figure 9B:
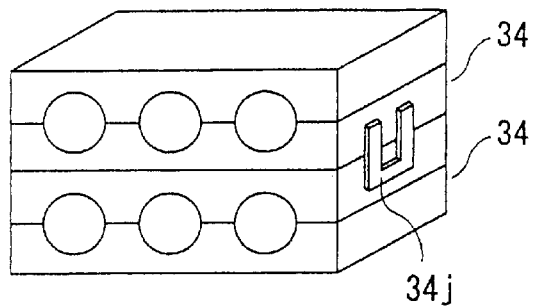
Figure 9B:
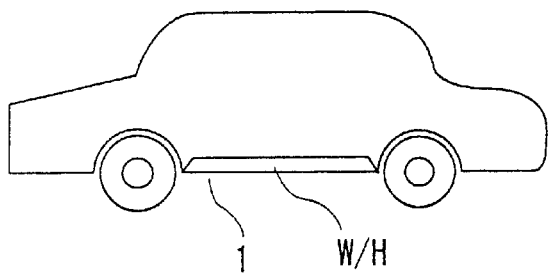

Further embodiments of the present invention are depicted in FIGS. 9(A) and (B) which show modifications of the clamp member. The clamp members 24, 34 are configured to be combined so that they may be stacked in two rows, one above the other.

In this case, by means of the dovetail groove and projection 24j provided on the joining face of clamp members 24 or the lock device 34j provided on the sides of the clamp members 34, the elongated electric wires W are held by clamping with the respective clamp members 24, 34, after which they are joined in a stack of two upper and lower parts. In addition, though not illustrated, in the case of accommodating the elongated electric wires W with the clamp members 24, 34, the receiving member is configured to have a height corresponding to the height of the stacked clamp members.

As apparent from the above explanation, according to the elongated electric wire accommodation structure into the protector of the present invention, where the elongated and large diameter electric wires are inserted into a protector in a parallel arrangement, the parallel arrangement is fixed by the clamp member, so that the accommodation work can be performed smoothly, and thus the efficiency of accommodation work is improved.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. JP 11-235205, filed on Aug. 23, 1999, which is expressly incorporated herein by reference in its entirety.

What is claimed is:

1. A protector for accommodating elongated electric wires, said protector comprising:

at least one trough-shaped receiving member for accommodating the electric wires in a parallel array;

a cover member for covering an open upper face of said receiving member; and at least one clamp member, provided separately from said receiving member, that clamps around and holds the electric wires in said parallel array.

2. The protector according to claim 1, wherein said receiving member includes at least one engaging part for positioning said at least one clamp member at a predetermined position.

3. The protector according to claim 2, wherein said at least one clamp member comprises a plurality of clamp members, and said at least one engaging part comprises a plurality of engaging parts provided at spaced distances to receive a respective one of said clamp members to position the electric wires in the parallel array along said protector.

4. The protector according to claim 2, wherein said at least one engaging part is provided on at least one of a bottom wall of said receiving member and opposed side walls of said receiving member.

5. The protector according to claim 2, wherein said at least one engaging part is configured as one of spaced parallel projections and a recess having spaced parallel walls, said engaging part configured to receive and hold said clamp member in position.

6. The protector according to claim 1, wherein said at least one clamp member comprises an upper part and a lower part, each said upper part and lower part having a complementary mating surface including at least one groove that receives one of the electric wires when said upper and lower parts are positioned in mating engagement.

7. The protector according to claim 6, wherein said upper and lower parts include complementary locking elements to retain said upper and lower parts in mating engagement.

8. The protector according to claim 7, further comprising a hinge element connecting first ends of said upper and lower parts, and wherein said complementary locking elements are provided on second ends of said upper and lower parts.

9. A method of providing a parallel array of elongated electric wires in a protector, comprising:

providing a protector including a trough-shaped receiving member;

providing at least one clamp member configured to clampingly receive a plurality of electric wires in parallel;

first, clamping the plurality of electric wires in said at least one clamp member; and then, inserting said at least one clamp member at a predetermined location in said receiving member to form said parallel array.

10. The method according to claim 9, wherein said providing of at least one clamp member includes providing a plurality of clamp members, said clamping includes clamping the plurality of wires at spaced locations along the length of the wires, and said inserting includes inserting said clamp members at predetermined locations in said receiving member.

11. The method according to claim 10, further comprising providing a plurality of engaging parts at each said predetermined location to receive and hold said clamp members inserted in said receiving member.

12. The method according to claim 9, wherein each said clamp member comprises an upper part and a lower part, each said upper part and lower part having a complementary mating surface including at least one groove that receives one of the electric wires when said upper and lower parts are positioned in mating engagement.

13. The method according to claim 12, wherein said upper and lower parts include complementary locking elements to retain said upper and lower parts in mating engagement.

14. The method according to claim 13, further comprising a hinge element connecting first ends of said upper and lower parts, and wherein said complementary locking elements are provided on second ends of said upper and lower parts.

15. A system for providing a parallel array of elongated wires, comprising:

a work support surface;

at least two wire holders mounted on said work support surface, each said wire holder configured to retain a plurality of wires in a spaced parallel array and at a position spaced above said work support surface;

at least one clamp member configured to clampingly receive the plurality of wires in the parallel array;

at least one clamp holder mounted on said work support surface between said at least two wire holders, said at least one clamp holder having a portion spaced from said work support surface and configured to receive a lower surface of said at least one clamp member; and wherein said at least two wire holders maintain the plurality of wires in said spaced parallel array during installation of said clamp member on the plurality of wires, and said clamp holder maintains said clamp member in position during installation so that the clamp member can be readily positioned to retain the plurality of wires in the spaced parallel array.

16. The system according to claim 15, wherein each said clamp member comprises an upper part and a lower part, each said upper part and lower part having a complementary mating surface including at least one groove that receives one of the plurality of wires when said upper and lower parts are positioned in mating engagement.

17. The system according to claim 16, wherein said upper and lower parts include complementary locking elements to retain said upper and lower parts in mating engagement.

18. The system according to claim 17, further comprising a hinge element connecting first ends of said upper and lower parts, and wherein said complementary locking elements are provided on second ends of said upper and lower parts.

* * * * *